United States Patent [19]

Hoffmann et al.

[11] Patent Number: 4,566,882
[45] Date of Patent: Jan. 28, 1986

[54] FILTER FOR CLEANING GASES

[75] Inventors: Harald Hoffmann, Much; Günter Henrich, Leverkusen; Heinz-Dieter Waldhecker, Rösrath, all of Fed. Rep. of Germany

[73] Assignee: Klockner-Humboldt-Deutz Ag, Fed. Rep. of Germany

[21] Appl. No.: 591,568

[22] Filed: Mar. 20, 1984

[30] Foreign Application Priority Data

Mar. 26, 1983 [DE] Fed. Rep. of Germany ....... 3311108

[51] Int. Cl.$^4$ .......................... B03C 1/02; B01D 46/36
[52] U.S. Cl. .......................................... 55/100; 55/293; 55/390; 55/474; 55/479; 55/484; 422/176; 422/178; 422/219; 422/223
[58] Field of Search ................. 55/100, 261, 285, 287, 55/293, 302, 390, 474, 479, 483, 484, 512; 422/176-178, 213, 219, 223

[56] References Cited

U.S. PATENT DOCUMENTS

| 2,834,119 | 5/1958 | Schaub | 55/390 |
| 4,360,364 | 11/1982 | Kohl | 55/390 |
| 4,452,613 | 6/1984 | Littrell | 55/287 |

FOREIGN PATENT DOCUMENTS

| 45722 | 4/1981 | Japan | 55/474 |
| 321536 | 11/1929 | United Kingdom | 422/177 |
| 560631 | 7/1977 | U.S.S.R. | 55/302 |
| 674270 | 10/1980 | U.S.S.R. | 55/293 |

Primary Examiner—David L. Lacey
Attorney, Agent, or Firm—Hill, Van Santen, Steadman & Simpson

[57] ABSTRACT

A filter structure including a circular housing and annularly disposed individual filter chambers each containing a layer of bulk filter material with a centrally located waste channel having openings leading from each of the chambers above the surface of the filter material, an outer jet for each chamber for directing a cleaning agent along the top of the filter material, a separate supply for fresh filter material at the top of each chamber, clean gas discharge conduits located below the individual filter chambers and a cleaning gas jet connected to each of the clean gas discharge conduits leading downwardly from each of the chambers.

11 Claims, 2 Drawing Figures

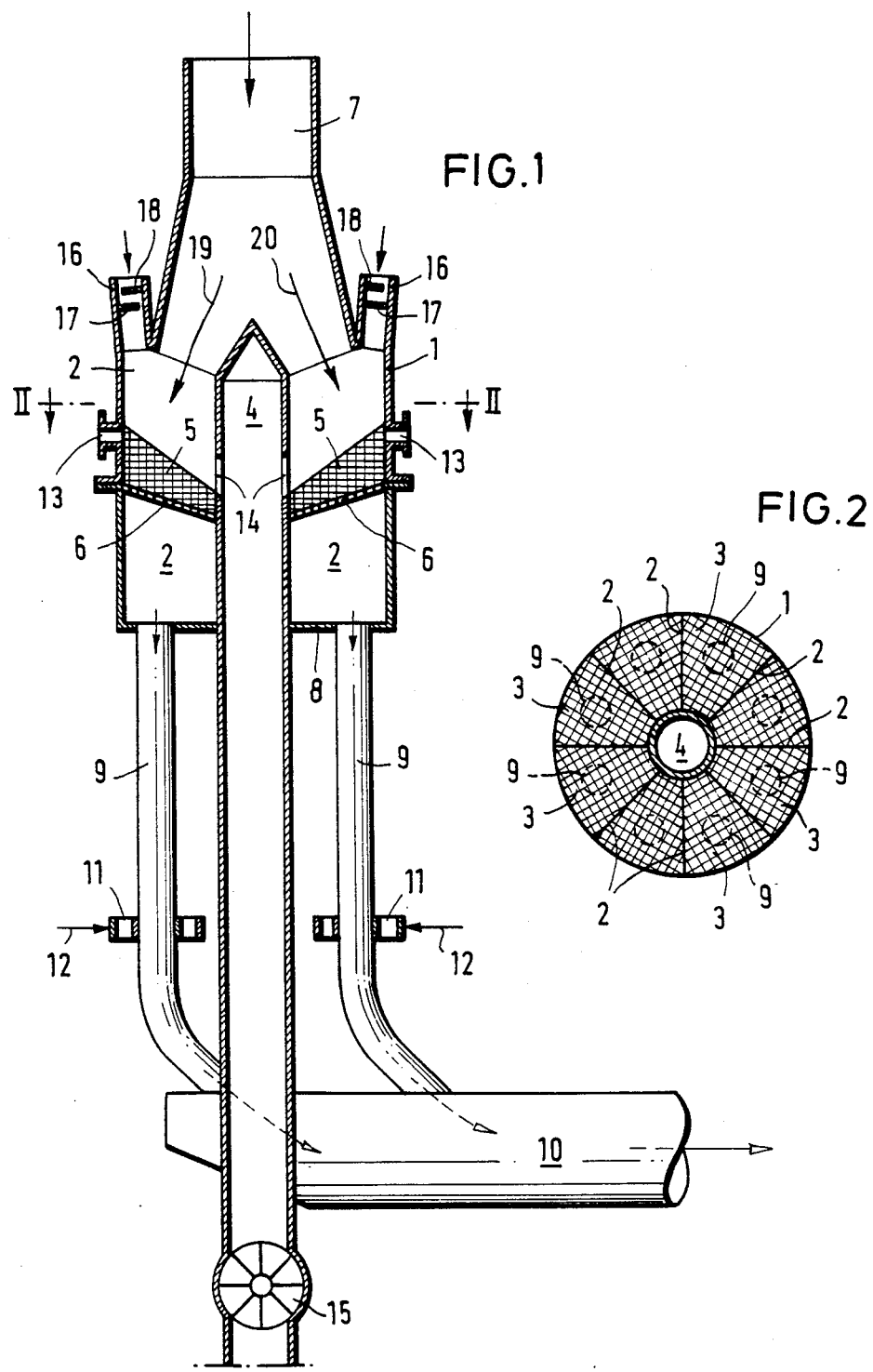

FILTER FOR CLEANING GASES

BACKGROUND OF THE INVENTION

The invention relates to improvements in filters, and more particularly to a filter for cleaning raw gases wherein the filter medium consists of a bulk layer of material preferably one that is resistant to high temperatures.

In gas cleaning filters of the type heretofore known, the filter medium commonly consisted of a single coherent bulk material layer horizontally located in a filter housing. A raw gas stream was conducted through the bulk material layer downwardly and the waste substances present in the gas which commonly consisted of solids, were absorbed and collected by the bulk layer material. The gas thus cleaned of the substances was then discharged through a clean gas channel.

Since the absorption capacity of the bulk material layer is relatively limited for agents precipitated out of the raw gases, the bulk material layer must be cleaned or freed of the deposited substances at regular intervals. When the bulk material layer had to be cleaned, the raw gas stream had to be interrupted and shut off while scavenging air was conducted through the bulk material layer and until the collected substances were removed. This structure and operation was disadvantageous in that it did not enable a continuous operation for cleaning gases. Thus, in order to obtain a continuous cleaning, it was necessary to provide two filters structured in such a manner as to be disposed in parallel and operating alternately so that they could be alternately subjected to a cleaning of the bulk material layer. This made such arrangements relatively involved and increased the cost of construction and the cost of operating.

It is accordingly an object of the present invention to provide an improved bulk material filter which avoids the foregoing disadvantages and which is capable of continuous operation with a cleaning of the filter material with a requirement of reduced space and reduced construction costs.

A further object of the invention is to provide a filter structure which enables improved filtering of raw gases with the use of bulk filter material utilizing a structure and operation which provides for maximum gas flow through without interruption due to cleaning of the filter material. A further object of the invention is to provide an improved filter structure which has accommodations for improved cleaning of the bulk filter material and which provides means for supplying fresh filter material without interrupting the continued filtering operation.

A feature of the invention accomplishing the above objectives embodies a filter which is divided into a plurality of chambers each containing a bulk material filling means with the chambers being annularly disposed around a central waste channel for the withdrawal of substances removed from the gases. The chambers are connected to each other via openings in the wall of the centrally located waste channel. Each chamber is connected to a raw gas feed from above and a clean gas discharge conduit leads from the lower end of each chamber. A plurality of annularly arranged intermittently operated chambers are thus provided so that continued filtering operation can be continued while one or more chambers is being subjected to a reverse flow of gas for a cleaning operation.

In accordance with the improved structure, each chamber is provided with a feeder for the admission of a filter medium which is located above the layer of bulk material, and means are provided for used filter medium to be removed without interrupting continual filtering operation and allowing for fresh filter material to be injected into the chamber.

In accordance with a feature of the invention, the layer of material in each of the chambers is disposed in a frusto-conical shape so as to resemble a funnel. This provides for a significant increase in the filter surface area as contrasted with a filter of the type heretofore available wherein the material was simply horizontally disposed in the filter. With the present arrangement, an overall filter housing of a given dimension is capable of providing substantially increased filtering area. This provides for improved cleaning, but is well adapted for refilling of the bulk material layer and for cleaning the bulk material layer.

In accordance with the invention, jets are provided for the feed of cleaning agents with the jets located in the outer chamber walls below the surface of the bulk material. With the use of these jets, the upper layer of the bulk material is blown off along with the substances which have been filtered out of the raw gas stream each time a cleaning occurs. By removal of the upper layer, an entire replacement of bulk material is not necessary, but the bulk material can be replenished and cleaned periodically and frequently in a manner which does not interrupt the continual operation of the filter.

A further cleaning of the filter material is accomplished in that each of the chambers has a clean discharge conduit leading downwardly from it, and each conduit is provided with at least one injector which is capable of introducing a cleaning gas or agent beneath the bed of the bulk filter material in each of the chambers. Thus, a cleaning of the bulk material layer can be accomplished from below as well as from the side. By the cleaning agent introduced below the bed, a pressure can be supplied opposing the weight of the layer of bulk material and opposing the flow of incoming raw gases. With the application of fresh gas from below, an agitation or cleaning of the bulk layer is accomplished augmented by a cleaning off of the top layer with the jets disposed in the filter chamber walls.

Other objects, advantages and features will become more apparent with the teaching of the principles of the invention in connection with the disclosure of the preferred embodiment thereof in the specification, claims, and drawings in which:

DESCRIPTION OF THE DRAWINGS

FIG. 1 is a side elevational view shown partially in section of a filter constructed and operating in accordance with the principles of the present invention; and FIG. 2 is a horizontal sectional view taken substantially along line II—II of FIG. 1.

DESCRIPTION OF THE PREFERRED EMBODIMENT

As shown in the drawings, the filter constructed and operating in accordance with the invention includes a cylindrically shaped and vertically disposed housing 1 which has a plurality of radially extending partitions 2 to divide the interior of the housing into individual chambers 3. These chambers are annularly disposed around a central waste channel 4.

Each chamber is provided with a perforate floor 6 which extends upwardly and outwardly from the waste channel 4 to support a layer of bulk material 5. The layer of bulk material slopes upwardly at its upper surface so as to be frusto-conical in shape, and the material will be naturally thusly inclined due to the sloping of the floor 6, and due to the location of the filling conduits 16 as will be further described later herein. This angular disposition of the top surface of the bulk filter material 5 increases the surface area facing the oncoming gas streams of raw gases shown at 19 and 20 by the arrowed lines. This arrangement also provides for a thicker filter layer at the outer edge of each of the chambers where a greater volume of gas flow occurs.

At the top, the housing 1 is connected to a raw gas supply conduit 7 which discharges downwardly into the chambers. The partitions 2 extend from the raw gas supply conduit down to the floor 8 of the housing to provide separate chambers. The filtering area which is faced by the descending raw gases is illustrated in FIG. 2.

As the gases are filtered to remove the undesirable substances, the cleansed gas is received by clean gas discharge conduits 9 which are connected to each of the channels at the floor 8. The conduits 9 are constructed so as to discharge into a common clean gas collecting conduit 10.

Each clean gas discharge conduit is equipped with at least one filter medium cleaning gas jet 11. Each of these jets is supplied with a cleaning gas supply as indicated by the arrows 12. These jets 11 can take various forms such as being injectors which are controlled and intermittently operated when the bulk filter material is to be cleaned.

Additional cleaning of the bulk filter material is accomplished by jets 13 which are located in the outer wall of the housing adjacent the surface of the bulk filter material for each chamber. The jets 13 discharge into the individual chambers 3 just below the surface of the bulk layer 5. The jets 13 are located essentially opposite openings 14 which are just at the upper surface of the bulk layer and lead from the individual chambers into the central waste channel 4. The openings 14 in the wall of the channel 4 serve for withdrawal of the substances filtered out of the gases and also for receiving the upper layer of bulk filter material which is blown off by operation of the jets 13. For cleaning of the bulk filter material, the jets 13 are operated and are supplied with the controlled injection of cleaning gas through valved pressure means, not shown. Simultaneously or intermittently therewith, the injectors 11 will direct a flow of cleaning gas upwardly through the bed 5 of the bulk filter material. Individual chambers are cleansed periodically and as will be observed, one chamber can be cleaned at a time while the remaining chambers can continue filtering raw gases without interruption. Or, several chambers can be cleaned at a time with the remaining chambers continuing to serve to filter the raw gases.

At the bottom of the central waste channel 4 is a control valve which is shown as a circular valve 15 which provides for the gas-tight discharge of materials falling downwardly in the channel 4.

When the cleaning of the individual channels is completed, fresh bulk filter material can be supplied to the upper surface of the bed 5 through a feeder 16 for each of the channels. This feeder can be utilized to supply a fresh surface layer for each cleaning, or can be used to supply a full new bed of bulk filter material if the bed is completely purged from the chamber. In order to provide a gas-tight valving for the feeder 16, a valve arrangement shown in the form of double pendulum flaps 17 and 18 are provided. New filter material is directed into each of the chambers with a pressure tank which is not shown, and which permits new bulk filter material to be pneumatically conveyed through the feeder 16 into each of the chambers. By proper control of pressures, of course, the valving arrangements 17 and 18 can be omitted.

In operation raw gas is supplied through the raw gas supply conduit 7 into each of the chambers 3 from the top in the direction of the arrows 19 and 20 such as at a velocity of 1 through 4 m/s. The raw gas permeates the bulk layer material 5 in the individual chambers and flows through the perforated floor supporting the bulk filter material. Solid substances are separated from the gas and the gas is cleaned with the cleaned gas flowing downwardly through the conduits 9 into the collecting conduit 10.

The solids thereby deposited into the bulk material layer 5 initially collect on the surface of the bulk material and build up a corresponding solids layer after a certain time. The cleaning of the bulk material layer then occurs either in accordance with a fixed cleaning schedule or when cleaning need is indicated. For example, a pressure meter may be provided to show the pressure drop across the bulk material layer 5 and when the pressure in any individual chamber shows a maximum pressure drop, a cleaning is indicated and that chamber may be cleaned. Cleaning may be done periodically starting with the chamber which shows the highest loss of pressure across the bed of bulk filter material. Cleaning occurs by the introduction of cleaning gas through the jet 11 into the conduit 9 so that the cleaning gas being introduced at a higher pressure provides a counterflow upwardly through the bulk material layer. A jet may be utilized at 11 to do a quick reversal of the flow direction of the cleaned gases by means of an injector effect.

Subsequently, a rinsing or cleaning material such as air or cleaned gas is blown inwardly radially through the jet 13 which is located in the chamber wall and which discharges into the chamber 3 below the surface of the bulk material 5. The solids which are deposited in the bulk filter material 5 are blown inwardly through the openings 14 into the waste channel 4 where they drop down to be discharged through the central rotary valve 15. In order to blow off the top layer of the bulk material 5, a plurality of jets 13 may be provided for each chamber. If desired, additional jets can be also located in the partitions 2.

The gas introduced through the jet 13 for cleaning the bulk material blows the undesired material and top layer inwardly through the openings 14. Following the cleaning operation, the bulk material which is discharged is replenished by being supplied with new fresh unused filter medium into the chamber 3 via the conduit 16. Due to the location of fill with the inlet conduit 16, the fresh material will flow downwardly and will automatically provide the sloping upper surface.

After the conclusion of the cleaning of the bulk material layer in respective chambers or in any individual chamber, the pressure of the jet 11 is shut off so that the gas flow in the conduit 9 can resume in its original downward direction. Thus, the opposing pressure which forced the cleaning flow in an upward direction is removed, and the return of flow in a downward direction due to the pressure of the incoming gases through the conduit 7 occurs. The cleaning of the bulk material in other chambers would occur in the same sequence. The bulk material in a plurality of chambers can be simultaneously cleaned under certain conditions with the remaining chambers continuing to be in operation for cleaning the gases. Thus, a cleaning of the chambers plus the continued operation of the filtering of the raw gas stream occurs simultaneously and without interrupting operation. In some instances where operation can be interrupted, a cleaning of the entire bulk material layer in all chambers can be undertaken simultaneously.

For the filtering material, substances such as sand, aluminum oxide, silicon oxide, can be advantageously employed, and these normally do not have any reaction with the substances removed from the gas and the materials are capable of being easily recleaned and reemployed as a filtering medium. Materials such as lime or activated carbon may be employed and frequently the contaminants in the gases will be retained by absorption, adsorption or chemisorption. Also, coke particles can be employed as a filtering medium when cleaning gases from a coal gasification in an iron bath process and a water gas reaction can be produced by means of injecting water into the approximately 1400° C. hot coal gas and the contaminated solids can thereby be largely gasified or converted into a gaseous phase. Also, solids having permanent magnetic properties can be employed as a bulk filter material, these being suitable for the separation of dust with corresponding magnetizability. Generally, all of the filter media are resistant to high temperatures so that high temperature gases, i.e., gases above 600° C. can also be advantageously cleaned with the aforedescribed filter in a simple and economical fashion.

The foregoing shows and describes a preferred embodiment, but it will be understood by those versed in the art that the principles of the invention are not restricted to the exemplary embodiments schematically shown in the drawing. For example, other cleanable or regenerable filtering bulk material can be employed in the individual chambers instead of the bulk material layer. Also, the bulk material layer in the individual chambers can be disposed descending from the inside to the outside, and the solids discharge can ensue toward an outside via an annular chamber. In this instance, the solid feed for renewing the filter media would occur by replenishment through an inwardly located pipe. Further, the cleaning operation of the individual chambers can be fully automated at anytime in a simple fashion with the assistance of known pressure measuring and control devices. Further, the supply of filter medium via the feeder 16 into the chambers 3 can also occur with the assistance of a pneumatic pressure tank so that the flap valves illustrated can be omitted. Thus, it will be seen that we have provided an improved arrangement and structure for the cleaning of gases with bulk filtering media which meets the objects and advantages above set forth and which provides for an improved filtering operation and which makes possible continued operation of a filtering process while cleaning the filtering medium.

We claim as our invention:

1. A filter for cleaning gases comprising:
a housing,
a raw gas feed conduit communicating with said housing,
a relatively large clean gas discharge conduit positioned adjacent said housing,
partition wall means defining a plurality of filter chambers annularly disposed within said housing,
a bulk material layer composed of granular solids disposed in said chambers,
a plurality of relatively smaller clean gas discharge conduits, one being connected to each filter chamber and each discharging into said relatively large clean gas discharge conduit,
a centrally disposed channel in said housing,
said bulk material layer in said chambers being disposed in annular fashion about said channel, and
said channel having openings therein above said bulk material layer providing fluid communication with said chambers.

2. A filter structure for cleaning gases constructed in accordance with claim 1:
wherein each chamber is provided with a feed conduit positioned and arranged for the introduction of bulk filter material above said layer of bulk filter material.

3. A filter structure for cleaning gases constructed in accordance with claim 1:
including means for holding the bulk filter material layer in each chamber in inclined relation to provide a frusto-conical surface facing oncoming raw gases.

4. A filter structure for cleaning gases constructed in accordance with claim 1:
including jets for supplying filter cleaning agents extending into the chambers below the surface of the bulk filter material.

5. A filter structure for cleaning gases constructed in accordance with claim 1:
including a jet for the admission of cleaning gas connected to the relatively smaller clean gas discharge conduit for each of the chambers.

6. A filter structure for cleaning gases constructed in accordance with claim 1:
wherein the bulk filter material is a material chosen from the group consisting of sand, aluminum oxide, silicon oxide, lime, activated carbon, coke, or solids having permanent magnetic properties.

7. A filter structure comprising in combination:
a housing separated into individual filter chambers, each containing a layer of bulk filter material,
a waste channel positioned in said housing for the discharge of substances separated from the gases passing through said filter material and having openings therein communicating with each filter chamber,
a raw gas feeder connected to the chambers so as to feed gases to be filtered downwardly through each filter chamber,
a clean gas discharge connected to each of said chambers for the removal of filtered gas, and
means for blowing waste substances collected in said filter chambers into said waste channel.

8. A filter structure constructed in accordance with claim 7:
wherein the individual filter chambers are annularly arranged around the waste channel which is centrally in said housing with said openings leading into the waste channel from the chambers.

9. A filter structure according to claim 7:
wherein said waste channel is centrally located with the filter chambers being annularly arranged around the waste channel, and filter material cleaning jets connected to each of said chambers at the outer wall thereof.

10. A filter structure according to claim 9 which includes:

filter material supply means connected to the upper end of each of the chambers.

11. A filter structure comprising in combination:

a circular housing separated into individual annularly arranged individual filter chambers each containing a layer of bulk filter material horizontally disposed in each of said chambers to accommodate downward flow of gases therethrough;

a centrally located waste channel for the discharge of substances separated from the gases having an opening leading from each chamber into the waste channel positioned above the layer of filter material;

a raw gas feeder positioned above the chambers and connected to each of the chambers for the feeding of raw gases to be filtered;

a separate clean gas discharge conduit leading from each of the chambers; and a cleaning agent jet extending through the housing for each of the chambers positioned at the top surface of the layer of bulk filter material for carrying waste material and filter material into the waste channel.

* * * * *